United States Patent
Prabhu K et al.

(10) Patent No.: US 8,233,254 B2
(45) Date of Patent: Jul. 31, 2012

(54) METHOD OF ENSURING THE COORDINATED ARC FAULT PROTECTION IN A HEIRARCHIAL POWER DISTRIBUTION SYSTEM

(75) Inventors: Prashant Purushotham Prabhu K, Bangalore (IN); Sanjay Kumar Chaudhary, Aalborg (DK); Zhenning Liu, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 609 days.

(21) Appl. No.: 12/422,126

(22) Filed: Apr. 10, 2009

(65) Prior Publication Data
US 2010/0259859 A1    Oct. 14, 2010

(51) Int. Cl.
*H02H 3/00* (2006.01)
*H02H 7/00* (2006.01)

(52) U.S. Cl. .......................................................... 361/62

(58) Field of Classification Search ............... 361/62–68
See application file for complete search history.

(56) References Cited

U.S. PATENT DOCUMENTS

| 4,996,646 A | 2/1991 | Farrington |
| 5,905,616 A | 5/1999 | Lyke |
| 6,292,340 B1 * | 9/2001 | O'Regan et al. ............... 361/78 |
| 6,297,939 B1 | 10/2001 | Bilac et al. |
| 6,522,509 B1 * | 2/2003 | Engel et al. ..................... 361/42 |
| 2007/0242402 A1 * | 10/2007 | Papallo et al. .................. 361/63 |
| 2010/0149700 A1 * | 6/2010 | Hastings et al. ................ 361/42 |

FOREIGN PATENT DOCUMENTS
WO    WO 03079511 A1    9/2003

* cited by examiner

*Primary Examiner* — Rexford Barnie
*Assistant Examiner* — Christopher Clark
(74) *Attorney, Agent, or Firm* — Shimokaji & Assoc., PC

(57) ABSTRACT

A coordinated arc fault protection scheme in a hierarchical power distribution system is disclosed. The methods according to embodiments of the present invention may be considered an "event and time graded" analysis. In event and time based analysis, the number of confirmed arc signature may be monitored with respect to time in the main feeder line as well as the branched feeders. The confirmed arc signature in the branched feeder, as well as in the main feeder, may be captured and time stamped. A trip command may be issued first in the intended branched feeder if the branched feeder experiences a minimum number of events within a given time. During the same time period, the main feeder also monitors similar arcing events. If the tripping of the branched feeder occurs and the main feeder still detects arcing events, the main feeder may be tripped after a certain period of time or a certain number of confirmed arc signature. If there is no arc in the branched feeder and the main feeder itself experiences the arc, then the main feeder may be tripped after a predetermined period of time so that the current to all the branched feeders may be cut and the main feeder may be protected.

17 Claims, 12 Drawing Sheets

METHOD OF ENSURING THE COORDINATED ARC FAULT PROTECTION IN A HEIRARCHIAL POWER DISTRIBUTION SYSTEM

BACKGROUND OF THE INVENTION

The present invention relates to apparatus and methods for providing arc fault protection in a circuit and, more particularly, apparatus and methods for ensuring coordinated arc fault protection in hierarchical power distribution systems, such as those used in aircraft.

In a typical hierarchical power distribution system, power controllers with built-in arc fault protection function provide protection against arcing faults, overload protections and differential protections in the main feeder line as well as in the individual branched feeders.

The coordination of overload protections and differential protections between the main feeder lines and the branch lines are inherently guaranteed by the current ratings of power controllers themselves. However, if a particular arcing is present in the branched feeder, a typical power controller with built-in arc fault protection may trip the main feeder line in addition to the intended branched feeder line having the arc fault, such that the power supply is disconnected from the particular load having the arc fault, as well as from other loads powered by the same main feeder line. causing undesirable power interruptions to those loads.

Conventional arc fault protection schemes may include a physical communication between the main feeder line and the branch feeder line, as well as between separate branch feeder lines. Such a physical connection may be used, in conventional arc fault protection schemes, to permit coordination such that, when an arc fault is present in a branch feeder, only that branch feeder load control unit may trip. However, this physical communication link may result in additional issues in terms of cost, weight, timing, and data throughput, etc.

As can be seen, there is a need for an arc fault protection scheme that may provide coordination between the power controllers with built-in arc fault protection of the various branch circuits as well as of the main circuit. Moreover, there is a need to provide such coordination reliably without the need for a physical communication link between various circuits.

SUMMARY OF THE INVENTION

In one aspect of the present invention, a method for coordinating arc fault protection in a power system comprises monitoring a number of confirmed arc signature with respect to time in a main feeder line of the power system and in at least one branched feeder line of the power system; tripping a circuit breaker in the branched feeder line when a first predetermined number of confirmed arc signature occur in the branched feeder line within a first predetermined period of time; and tripping a circuit breaker in the main feeder line when a second predetermined number of confirmed arc signature occur in the main feeder line within a second predetermined period of time, wherein the second predetermined period of time is greater than the first predetermined period of time such that an arc in the branched feeder line trips only the circuit breaker in the branched feeder line without tripping the circuit breaker in the main feeder line.

In another aspect of the present invention, a method for coordinating arc fault protection in a power system comprises monitoring a number of confirmed arc signature with respect to time in a main feeder line of the power system and in at least one branched feeder line of the power system; tripping a circuit breaker in the branched feeder line when a first predetermined number of confirmed arc signature occur in the branched feeder line within a first predetermined period of time; and tripping a circuit breaker in the main feeder line when a second predetermined number of confirmed arc signature occur in the main feeder line within a second predetermined period of time, wherein the second predetermined period of time is greater than the first predetermined period of time such that an arc in the branched feeder line trips only the circuit breaker in the branched feeder line without tripping the circuit breaker in the main feeder line; and there is an absence of any physical connection between a controller in the main feeder line and a controller in any of the branched feeder lines.

In a further aspect of the present invention, an apparatus for coordinating arc fault protection in a power system comprises a main feeder line supplying power to at least a first and a second branched feeder; a control unit in each of the main feeder line and the first and second branched feeder lines for detecting an arcing event therein; and a circuit breaker in each of the main feeder line and the first and second branched feeder lines, wherein the control unit in the branched feeder line counts the number of confirmed arc signature and signals the circuit breaker to trip when a first predetermined number of confirmed arc signature occur within a first predetermined period of time; the control unit in the main feeder line counts the number of confirmed arc signature and signals the circuit breaker to trip when a second predetermined number of confirmed arc signature occur within a second predetermined period of time; the second predetermined period of time is greater than the first predetermined period of time such that an arc in the branched feeder line trips only the circuit breaker in the branched feeder line without tripping the circuit breaker in the main feeder line.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide apparatus and methods of ensuring a coordinated arc fault protection scheme in a hierarchical power distribution system. The methods according to embodiments of the present invention may be considered an "event and time graded" analysis. In event and time based analysis, the number of confirmed arc signature may be monitored with respect to time in the main feeder line as well as the branched feeders. The arcing events in the branched feeder, as well as in the main feeder, may be captured and time stamped. A trip command may be issued first in the intended branched feeder if the branched feeder experiences a minimum number of events within a given time. During the same time period, the main feeder also monitors similar arcing events. If the tripping of the branched feeder occurs and the main feeder still detects arcing events, the main feeder may be tripped after a certain period of time or a certain number of confirmed arc signature. If there is no arc in the branched feeder and the main feeder itself experiences the arc, then the main feeder may be tripped after a predetermined period of time so that the current to all the branched feeders may be cut and the main feeder line may be protected.

The methods according to embodiments of the present invention may determine the presence of an arc not based solely on energy measurements, but by analyzing the energy signal and detection the presence of an arc signature.

Embodiments of the present invention may be beneficial to any typical power distribution system. For example, the apparatus and methods according to embodiments of the present invention may be beneficial in primary and secondary power distribution systems in aircraft, in residential buildings, oil refineries, industrial electrical protection and naval applications.

Figure 1:
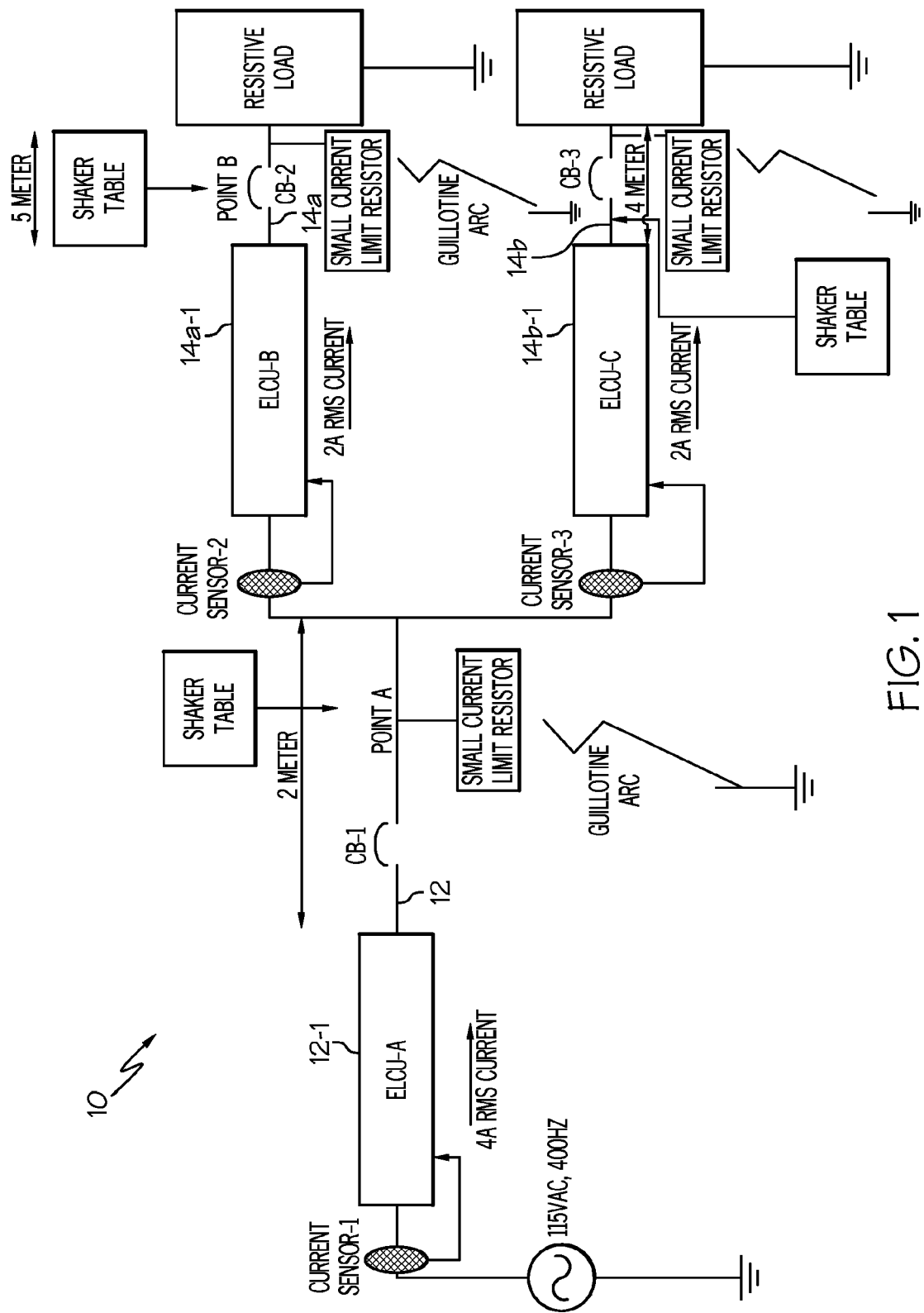
FIG. 1 is a schematic drawing showing a hierarchical power distribution system for executing a method according to an embodiment of the present invention.

Referring to FIG. 1, there is shown a schematic drawing of a hierarchical power distribution system 10 for executing a method according to an embodiment of the present invention. A main feeder line 12 may distribute power to first and second branched feeder lines 14a, 14b. Electronic load control units (ELCUs) 12-1, 14a-1, 14b-1 may monitor arc faults on the main feeder line 12 and the branched feeder lines 14a, 14b, respectively. For study purposes, faults may be generated at Point A, Point B or Point C, as discussed in greater detail below.

By using the method according to an embodiment of the present invention, if any arc occurs in one of the branched feeder lines 14a, 14b, then only the relay/switch in that branch should trip immediately, leaving the relay in the main feeder line 12 unaffected so that power to the other branched feeders may be available. Similarly, if there is any arc in the main feeder line 12, then the power to all the branched feeder lines 14a, 14b should be discontinued so that no load gets affected due to the arc. Therefore, embodiments of the present invention contemplate an arc co-ordination strategy that may be taken to prevent unneeded power interruption.

For example, assuming all circuit breakers, CB-1, CB-2 and CB-3 are closed, as shown in FIG. 1, and an arc is initiated at Point B, then CB-2 should trip after a given period of time, while CB-1 and CB-3 should remain closed. Should an arc be initiated at Point A, then CB-1 should get tripped, discontinuing the power to the branched feeder lines 14a, 14b.

Embodiments of the present invention may create the desired co-ordination between various arc fault protection devices without having any physical communication established in between any two particular ELCUs. Such co-ordination may be achieved with the event and time-based scheme as described in greater detail below.

Figure 2:
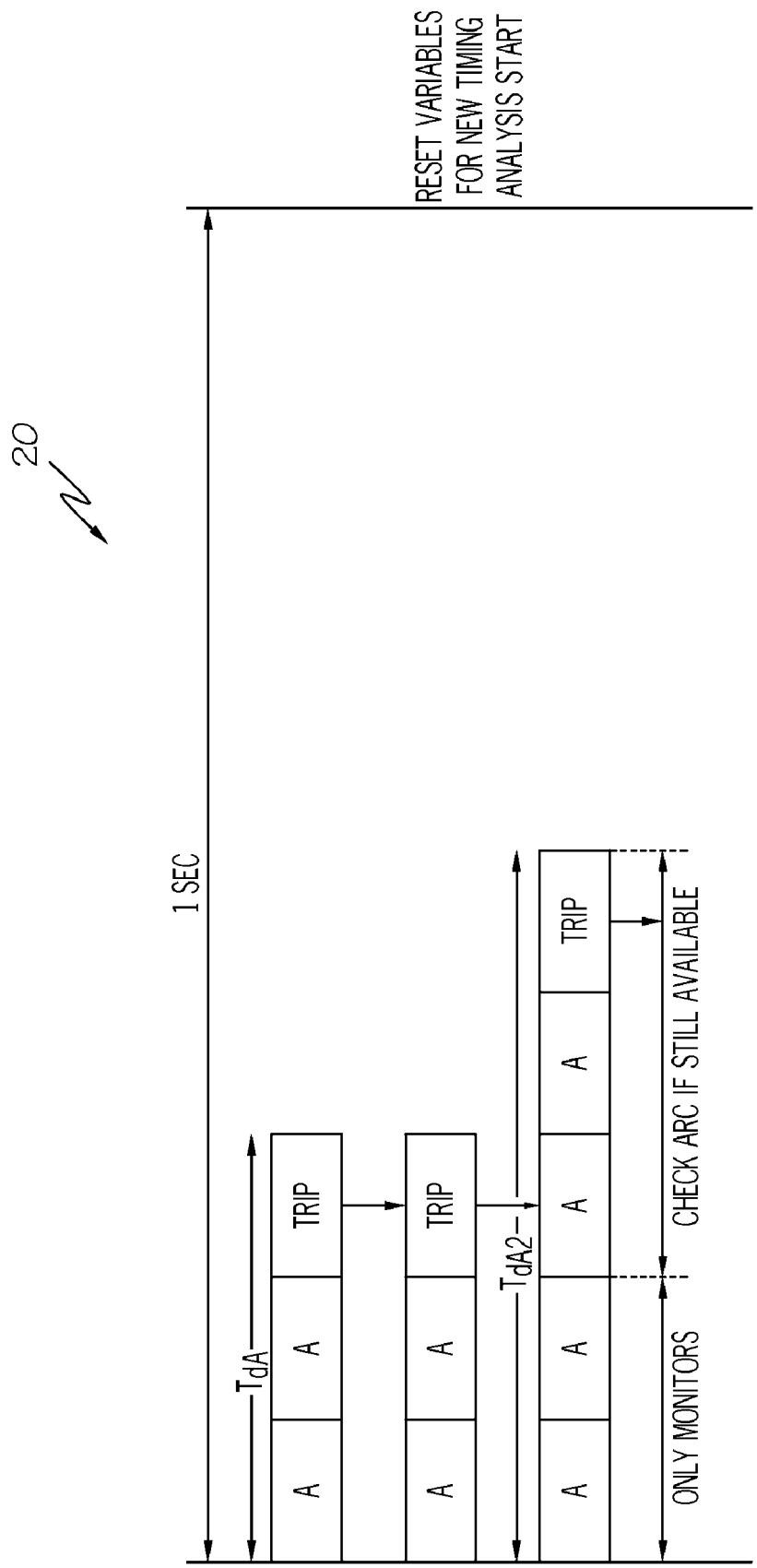
FIG. 2 is a time-line showing the event and time graded protection scheme according to an embodiment of the present invention.

Referring now to FIG. 2, there is shown a time-line 20 of the event and time graded protection scheme according to an embodiment of the present invention. The event and time graded analysis scheme adapted may provide a solution by monitoring the arcing events at each branched feeder line 14a, 14b (see FIG. 1) and may provide co-ordination activity between the main feeder line 12 and the branched feeder lines 14a, 14b.

In FIG. 2, the event and time based analysis method according to an embodiment of the present invention may monitor the number of confirmed arc signature with respect to time. For example, Point B (see FIG. 1) may monitor two confirmed arc signature within time period TdA1 and the arc algorithm may confirm this as an arc. In this case, the circuit breaker CB-2 may trip.

At Point A, the ELCU 12-1 may also monitor two confirmed arc signature within time period TdA1 but it doesn't take any action. The ELCU 12-1 may further start monitoring the arcing if any arc is available down the line within time period TdA2. Now if ELCU 12-1 still finds more arcs (for example, greater than four confirmed arc signature) within time period TdA2 then the ELCU 12-1 may trip. If the ELCU 12-1 sees less arcs (for example, ←4 arcs) and both ELCU 12-1 and ELCU 14a-1 did not trip within TdA1 and TdA2 respectively, then after a known time (e.g., 1 sec) ($TdA_{total}$) all the counters may be reset and again the algorithm may start looking for fresh arcing events. This resetting period may be a predetermined value that resets after detection of the first arc fault, as shown in FIG. 2.

It should be noted that the TdA1 and TdA2 timing values were tested in the lab environments and are well within the SAE timing requirements of <100 ms for a parallel arc. The $TdA_{total}$ value (1 sec) may be a tentative figure and may be refined depending on the specific application.

Figure 3A:
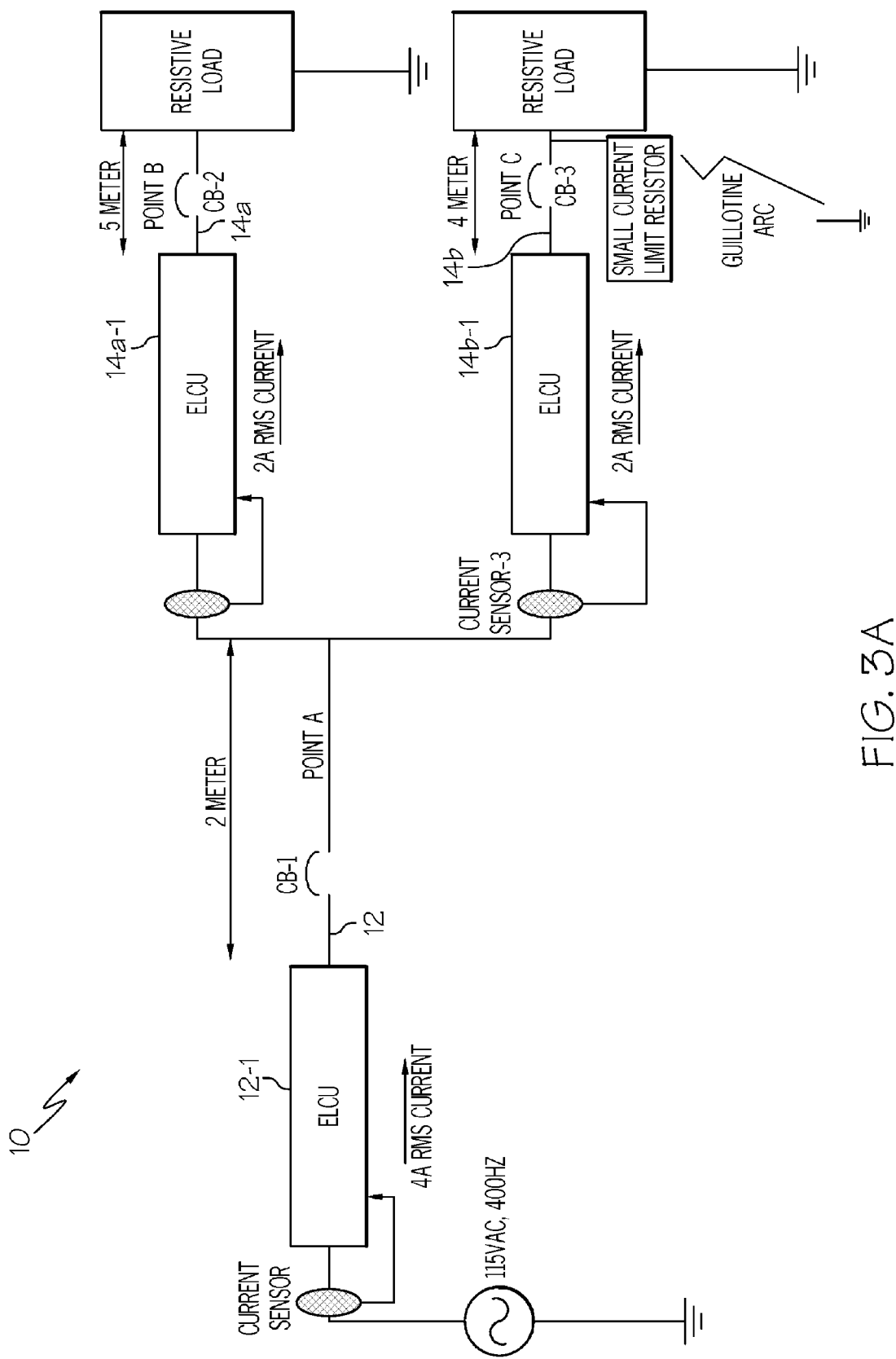
FIG. 3A is a schematic drawing showing a hierarchical power distribution system, with a parallel arc fault generated in a branched feeder therein, for executing a method according to an embodiment of the present invention.
Figure 3B:
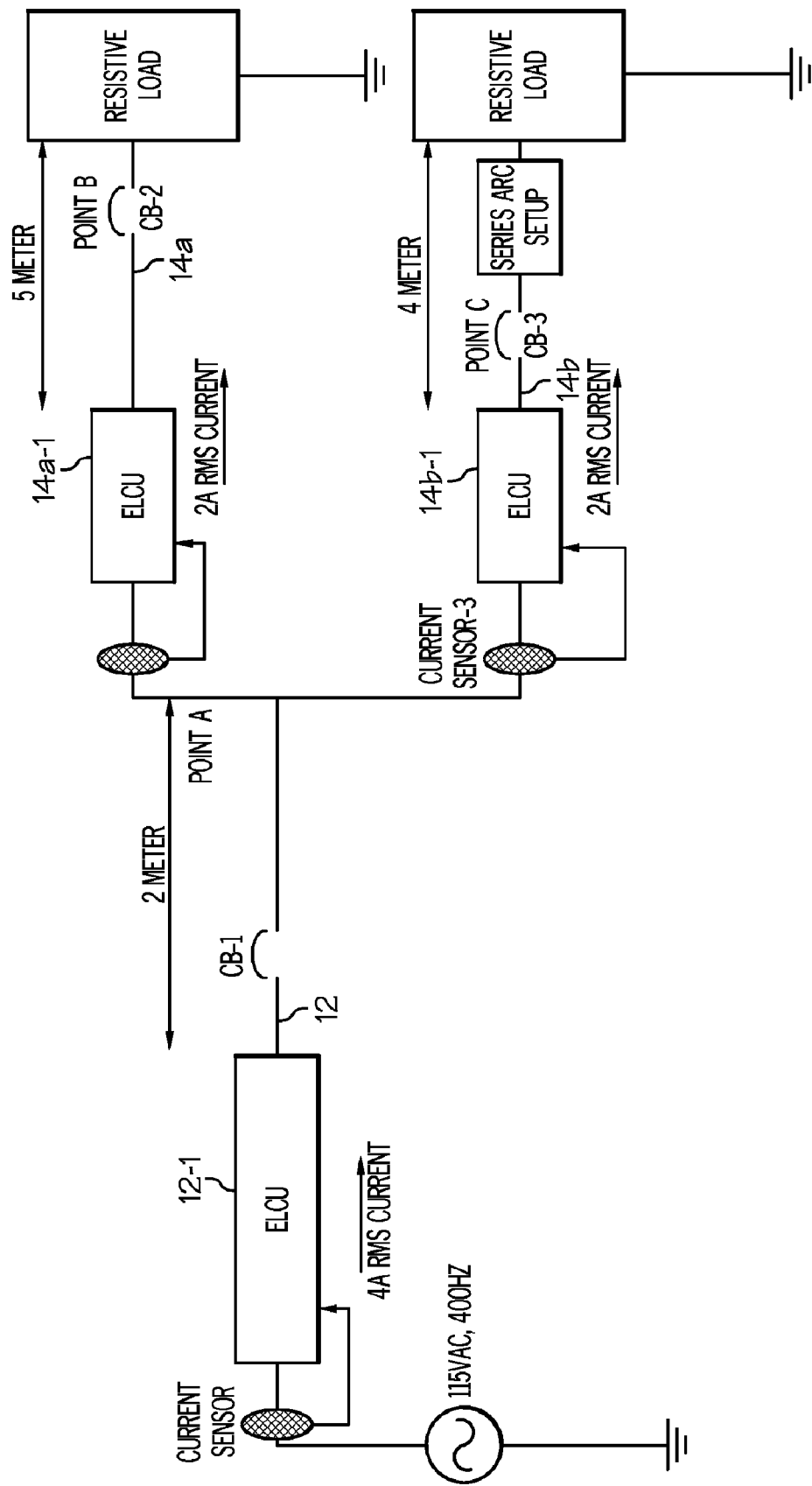
FIG. 3B is a schematic drawing showing a hierarchical power distribution system, with a series arc fault generated therein, for executing a method according to an embodiment of the present invention.
Figure 3C:
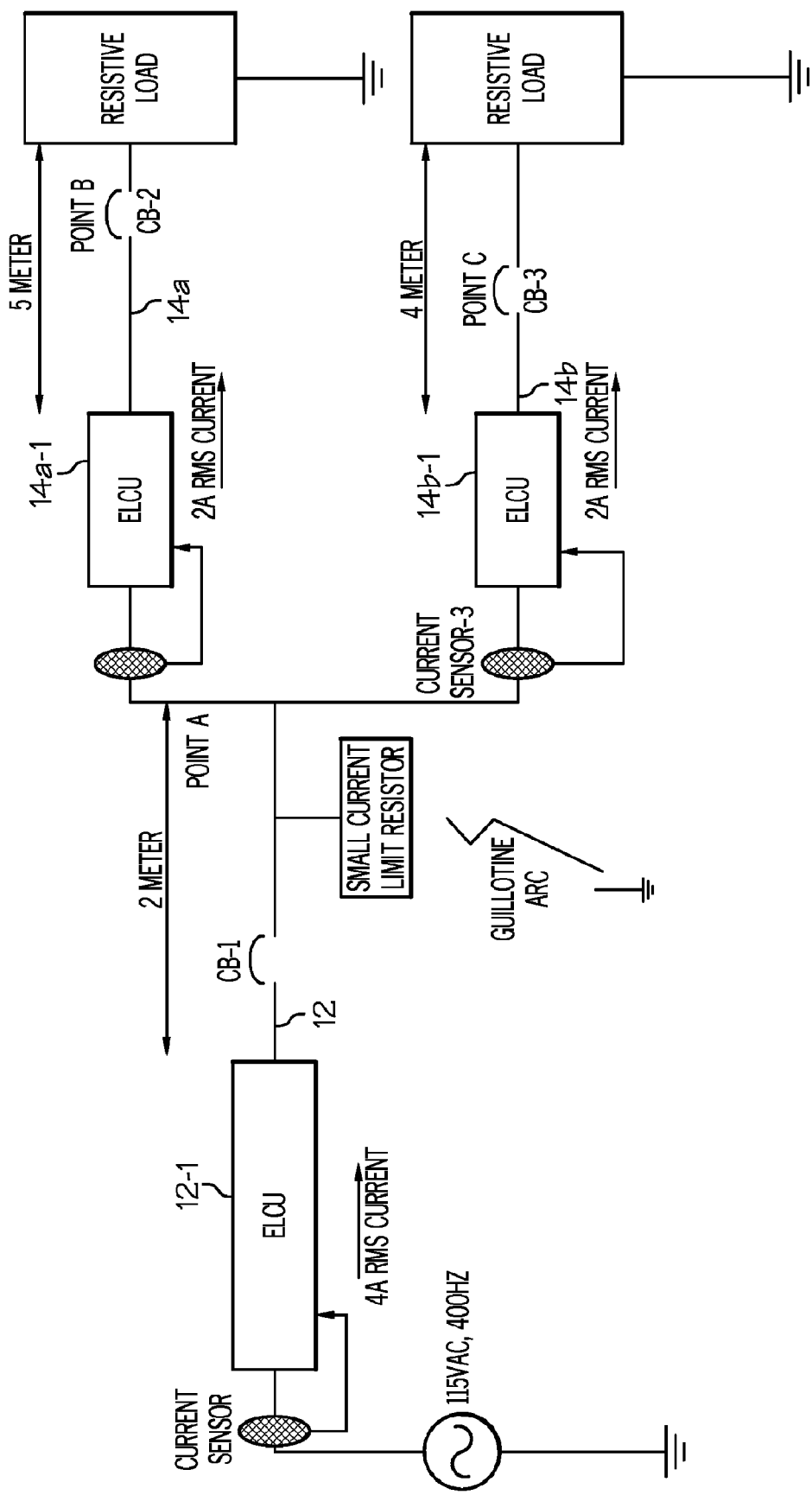
FIG. 3C is a schematic drawing showing a hierarchical power distribution system, with a parallel arc fault generated in a main feeder therein, for executing a method according to an embodiment of the present invention.
Figure 3D:
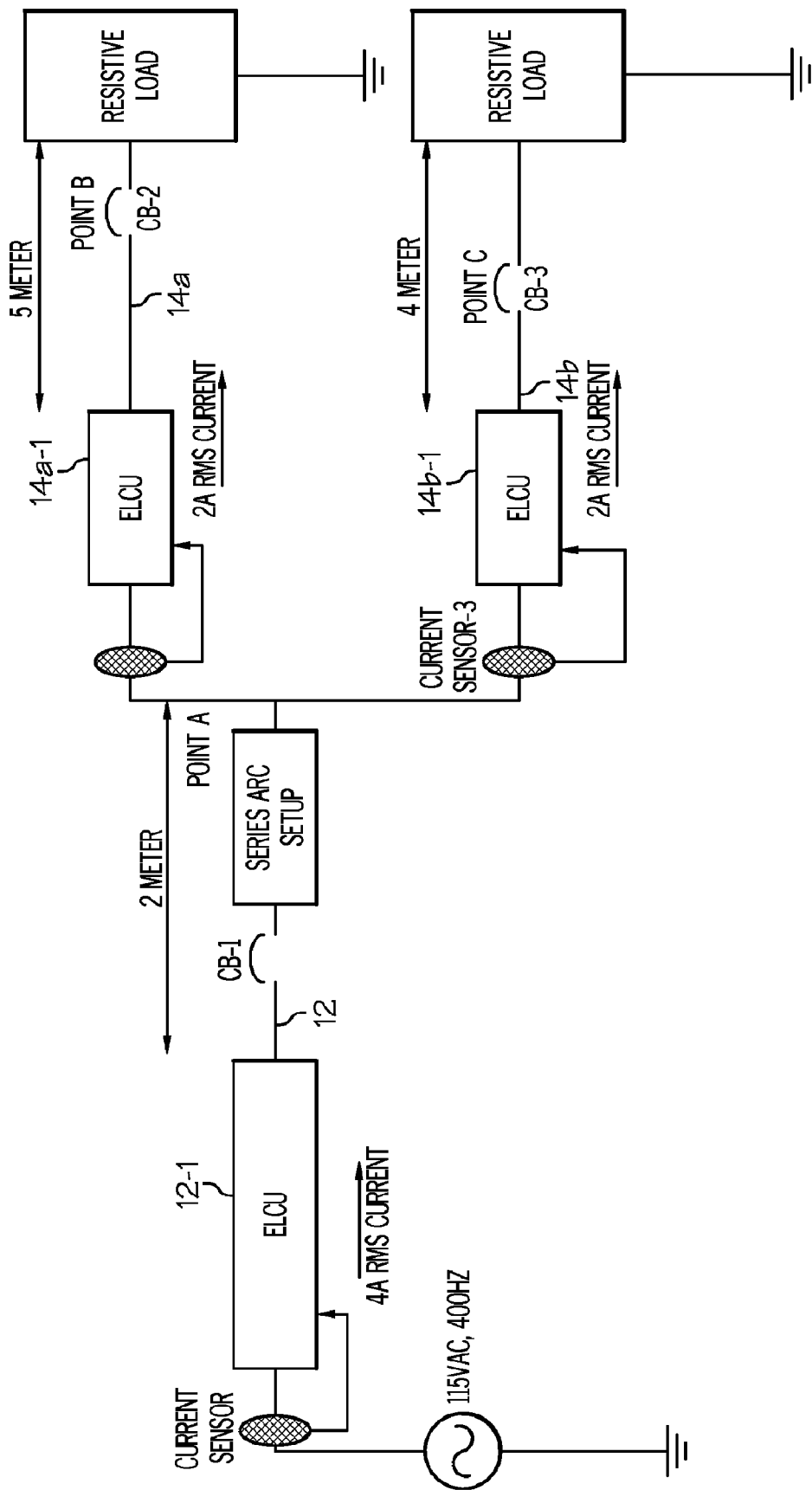
FIG. 3D is a schematic drawing showing a hierarchical power distribution system, with a series arc fault generated in a main feeder therein, for executing a method according to an embodiment of the present invention.

Referring to FIGS. 3A through 3D, there are shown cases in which the co-ordination tests were performed in the lab. In FIG. 3A, a parallel arc (such as a guillotine arc) may be created in branched feeder line 14b at Point C. In FIG. 3B, a series arc may be established in branched feeder line 14b at Point C. In FIG. 3C, a parallel arc may be created in the main feeder line 12 at Point A. In FIG. 3D, a series arc may be established in the main feeder line 12 at Point A. While FIGS. 3A through 3D refer to parallel and series arcs, any arc signature may be detected by the ELCU 12-1, 14a-1, 14b-1, including wet arcs, ground arcs and the like. In FIGS. 3A through 3D, the actual current passing through each feeder line 12, 14a, 14b and the length of each feeder line 12, 14a, 14b as used to obtain the below results, are shown.

The co-ordination tests were performed for all the above four cases (FIGS. 3A through 3D) and a number of similar trials were taken. The event and timing analysis technique according to an embodiment of the present invention provided 100% co-ordination when arcs were generated in the main feeder line 12 and branched feeder lines 14a, 14b for the above described hierarchical power distribution system. The following tables show the success result of the coordinated arc fault protections in a hierarchical power distribution system.

TABLE 1

Results of Coordination tests - For Parallel arc

| Test | Number of Trials | Number of passes | Number of Fails | Results (%) |
|---|---|---|---|---|
| Parallel Arc in the Main feeder | 5 | 5 | 0 | 100 |
| Parallel Arc in Branch feeder B | 5 | 5 | 0 | 100 |
| Parallel Arc in Branch feeder C | 5 | 5 | 0 | 100 |

TABLE 2

Results of Coordination tests - For Series arc

| Test | Number of Trials | Number of passes | Number of Fails | Results (%) |
|---|---|---|---|---|
| Series Arc in the Main feeder | 5 | 5 | 0 | 100 |
| Series Arc in Branch feeder C | 5 | 5 | 0 | 100 |

Figure 4A:
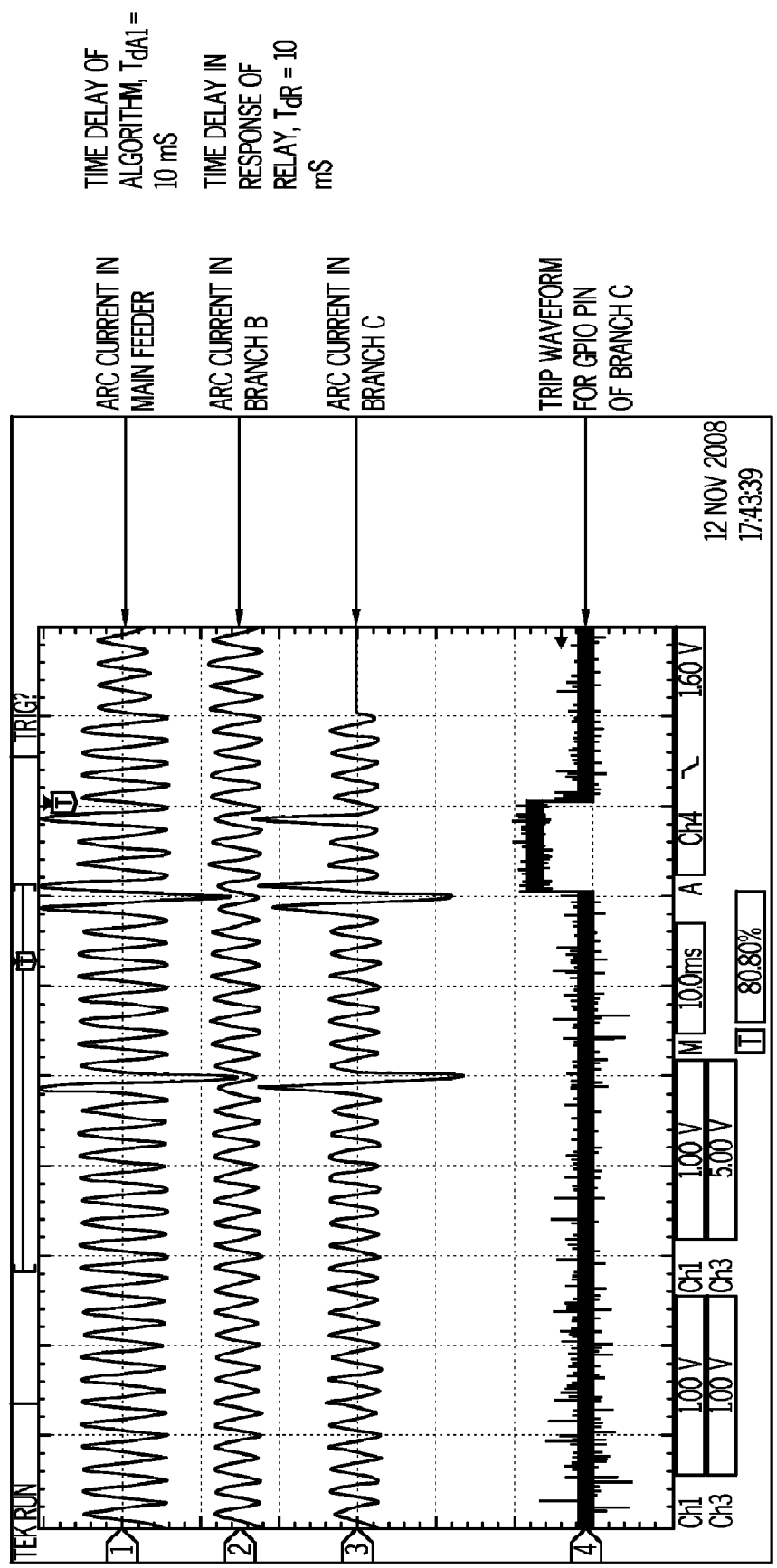
FIG. 4A is a screen image showing the signature currents for a parallel arc fault in a branch feeder circuit.
Figure 4B:
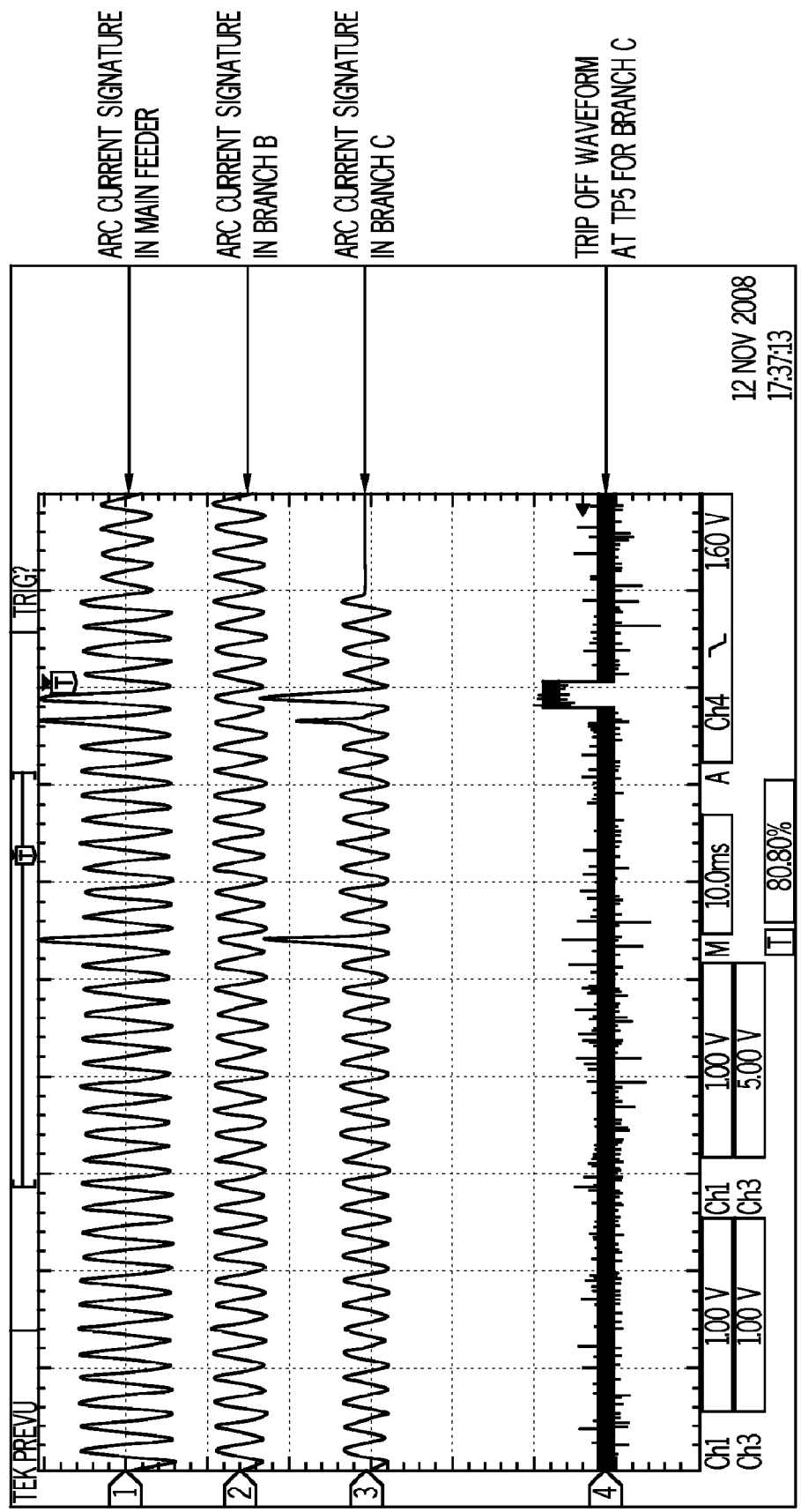
FIG. 4B is a screen image showing a second test showing the signature currents for a parallel arc fault in a branch feeder circuit.
Figure 4C:
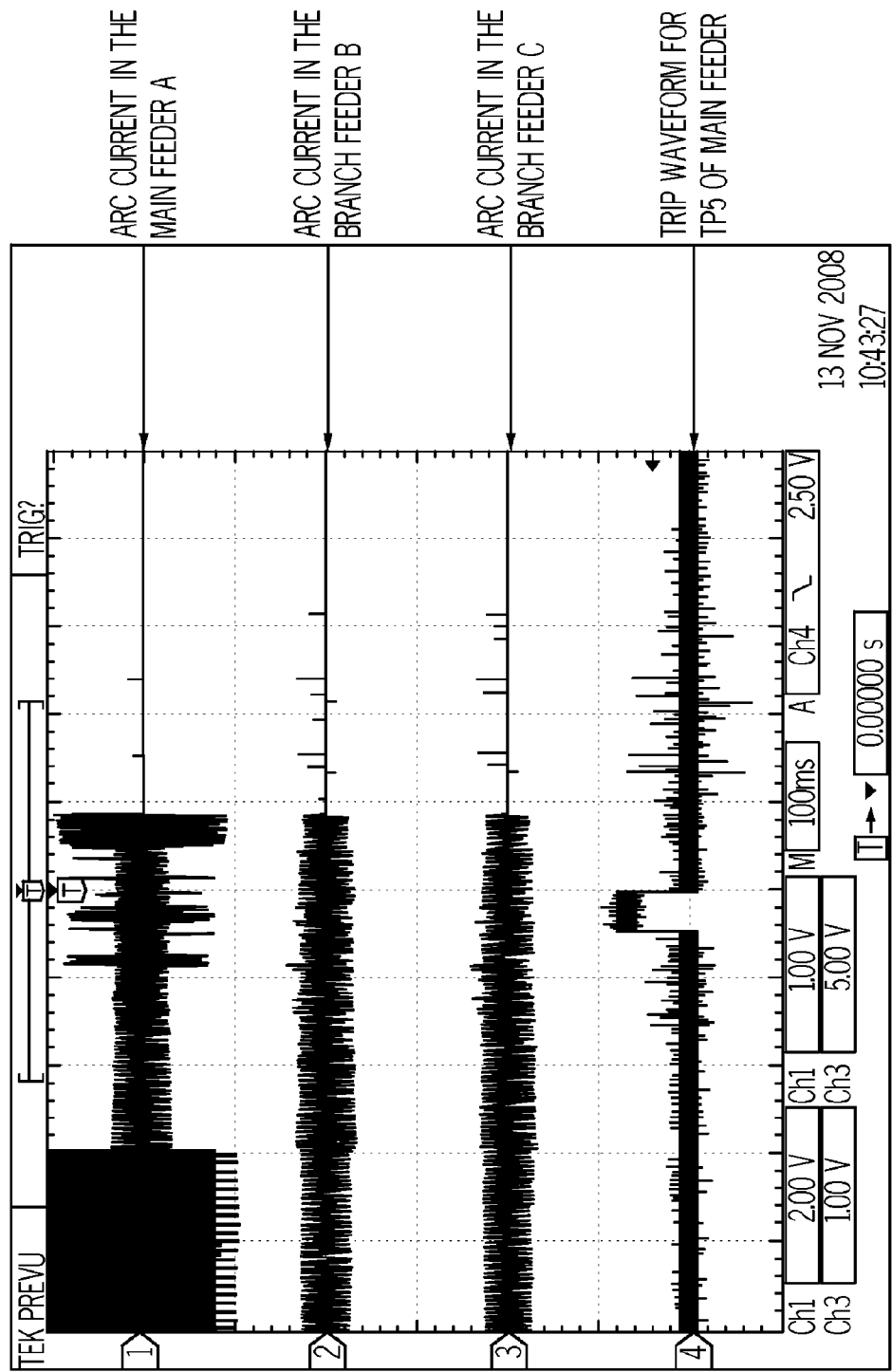
FIG. 4C is a screen image showing the signature currents for a parallel arc fault located in a main feeder circuit.
Figure 4D:
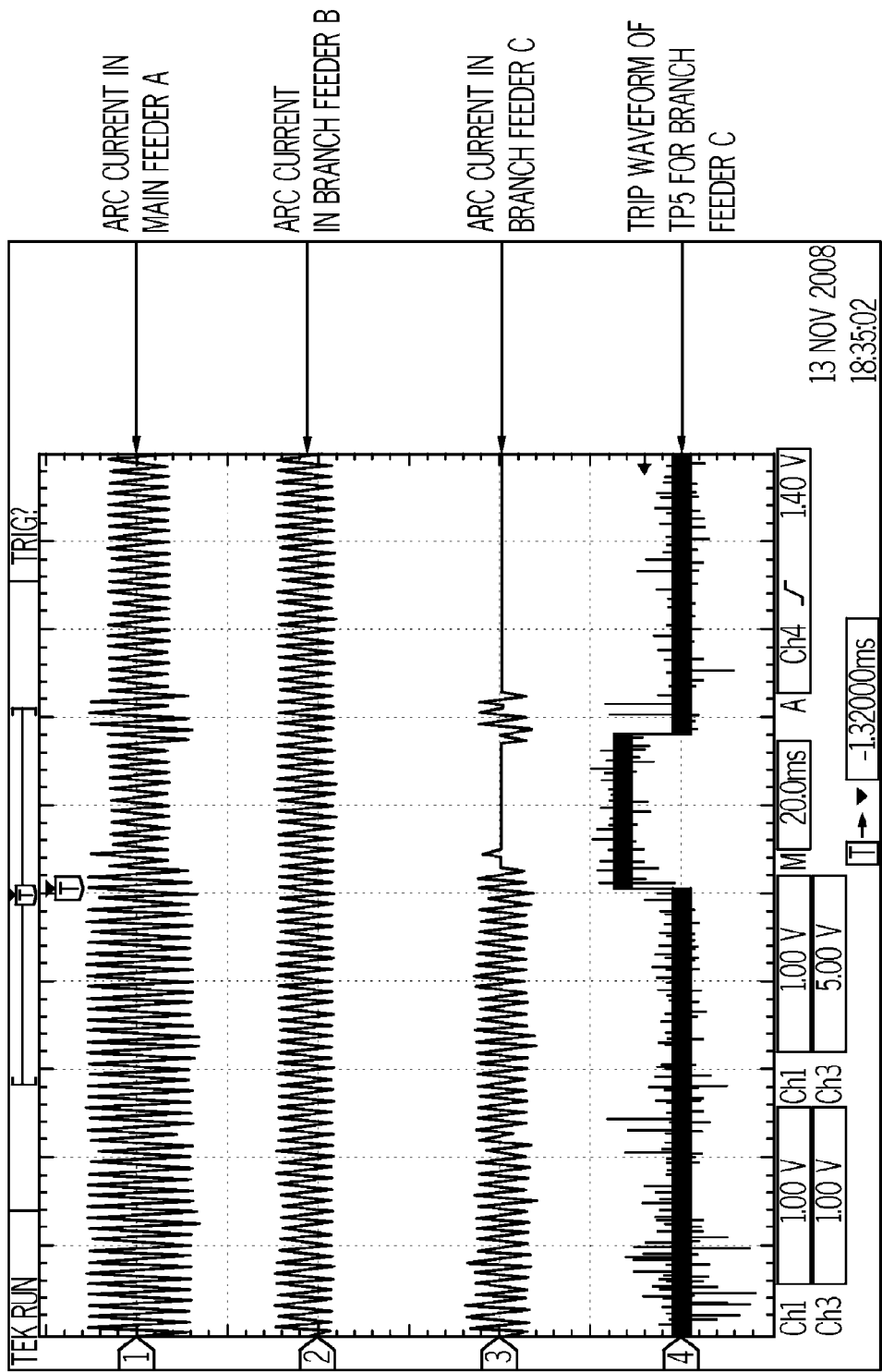
FIG. 4D is a screen image showing the signature currents for a series arc fault located in a branch feeder circuit.
Figure 4E:
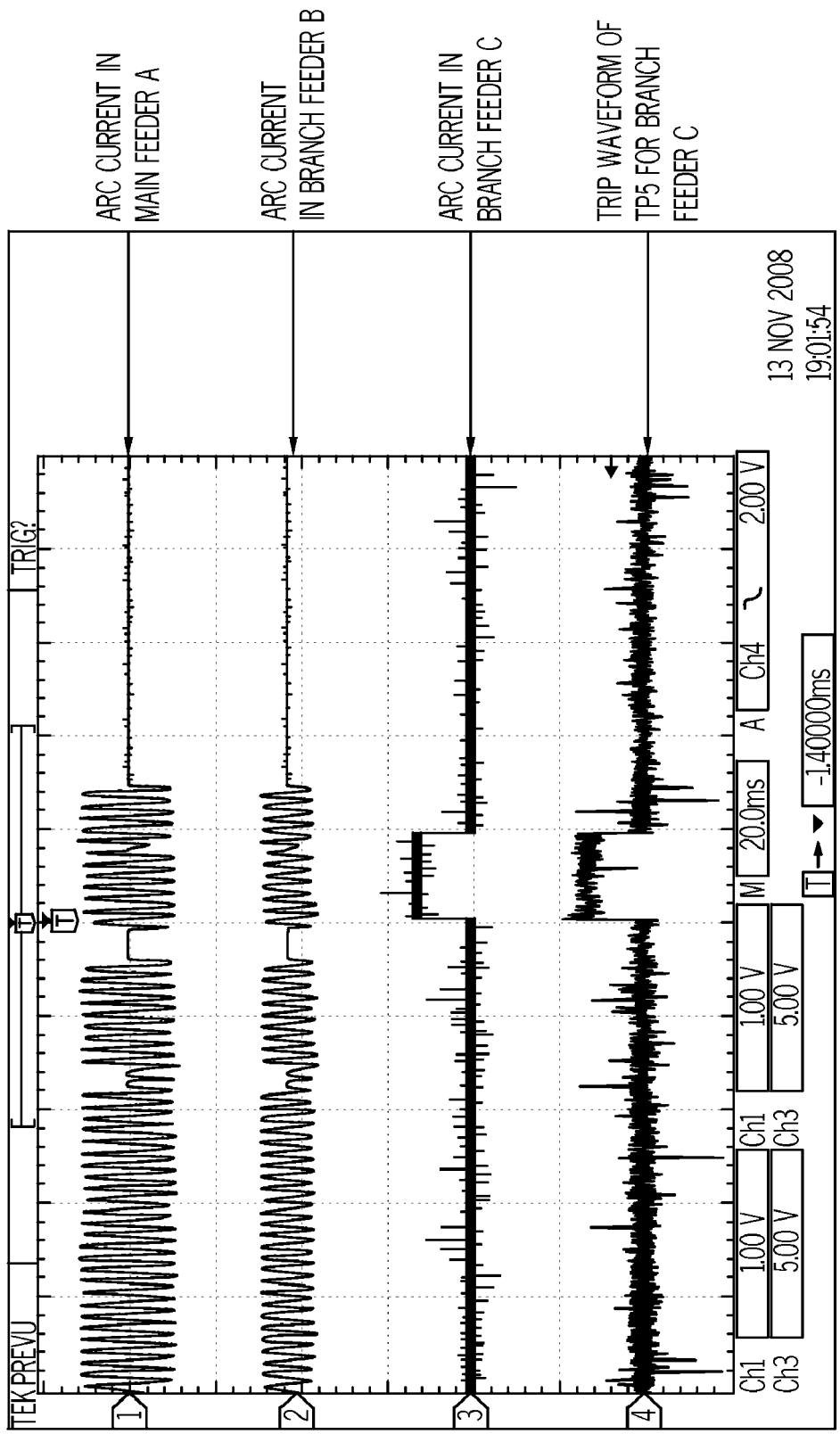
FIG. 4E is a screen image showing the signature currents for a series arc fault located in a main feeder circuit.

Referring now to FIGS. 4A through 4E, there are shown screen images of exemplary signature currents for various arcs in various circuits from FIGS. 3A through 3D. In FIG. 4A, there is shown a screen image of the signature currents for a parallel arc fault in a branch feeder circuit. In FIG. 4B, there is shown a screen image of a second test showing the signature currents for a parallel arc fault in a branch feeder circuit. In FIG. 4C, there is shown a screen image of the signature currents for a parallel arc fault located in a main feeder circuit. In FIG. 4D, there is shown a screen image of the signature currents for a series arc fault located in a branch feeder circuit. In FIG. 4E, there is shown a screen image of the signature currents for a series arc fault located in a main feeder circuit.

Lab Results:

In the Lab setup, the Co-ordination Activity was performed using three ELCU Controllers as per the setup shown in FIGS. 2A, 2B, 2C and 2D. The ELCU controllers have DSP controller TMS320F28016. The Arc Fault and Co-ordination algorithm according to an embodiment of the present invention monitored different arcs and performs co-ordination at different places as discussed in detail below.

Referring to FIGS. 4A and 4B, there is shown the co-ordination of ELCUs happening for the parallel arc fault test at branch feeder line 14b (see FIG. 3A).

Specifically referring to FIG. 4A, the lower waveform 40a-4 shows a pulse which is exactly the response of the algorithm for arc fault when TdA1=10 mS (See FIG. 2). If the main feeder arc current signature 40a-1 was observed, it may show the sum of currents of the two branched feeder lines (14a, 14b) before tripping off of relay (ce-30) in Branch C (14b). After tripping of the relay in the branch feeder line, the current waveform 40a-1 in the main feeder line (12) was the same as the current waveform 40a-2 in Branch B (14b), as no additional arcing events were detected.

Specifically referring to FIG. 4B, in a second trial of the Branch C parallel arc test, a time delay of the algorithm, TdA1, was 4 mS. Similar to the case above, the time delay of the relay to trip off, TdR was 10 mS.

Referring to FIG. 4C, there is shown the co-ordination of ELCUs happening for a parallel arc fault in the main feeder line 12 at Point A (see FIG. 2C). In this case, the time delay of the algorithm, TdA2, was 50 ms and the time delay of the relay to trip off, TdR, was 80 ms. FIG. 4C shows the co-ordination activity happening between the main feeder and the branched feeder lines. In this case, the parallel arc was generated at the Point A (Main Feeder) where ELCU 12-1 observed a parallel arc fault. It could be seen that the DSP Controller sends a trip command after 50 ms and that all the currents in the branched feeder lines as well as current in the main feeder were cleared soon after 130 ms.

Referring to FIG. 4D, there is shown the co-ordination of ELCUs happening for a series arc fault in the branched feeder line at Point C (see FIG. 3B). In this case, the time delay of the algorithm, TdA1, was 35 ms and the time delay of the relay to trip off, TdR, was 10 ms. FIG. 4D shows the co-ordination activity happening between the main feeder and the branched feeder. In this case the series arc was generated at the Point C where ELCU 14b-1 was observing a series arc fault. It could be seen that the DSP controller sent a trip command after TdA1=35 ms and the currents in the branched feeder line associated with Point C were cleared soon after 45 ms. The main feeder continued supplying power to the other branched feeder line B because once the circuit breaker was opened in the branched feeder line, the main feeder ELCU 12-1 no longer detected any arc fault signatures.

Referring to FIG. 4E, there is shown the co-ordination of ELCUs happening for a series arc fault in the main feeder at Point A (see FIG. 2D). In this case, the time delay of the algorithm, TdA2, was 20 mS and the time delay of the relay to trip off, TdR, was 10 mS. FIG. 4E shows the co-ordination activity happening between the main feeder and the branched feeder. In this case the series arc was generated at the Point A where ELCU 12-1 was detecting a series arc fault. It could be seen that the DSP Controller sent a trip command after TdA2=20 ms and the currents in the branched feeder lines were cleared soon after 30 ms from the first arcing event.

While the above description relates to a single main feeder line and two branched feeder circuits, embodiments of the present invention may include additional main feeder lines and either additional branched feeder circuits or even further branching of the individual branched feeder circuits. For example, a branched feeder line may branch into several sub-branched feeder lines. In this case, the sub-branched feeder lines may be coordinated with the branched feeder lines and the main feeder line in the same series. A first number of arc faults may need to be detected over a first period of time to trip a circuit breaker in the sub-branched feeder line. Then, if the branched feeder line upstream from the sub-branched feeder line still detects an arc fault, after a second number of arc faults over a second period of time, the circuit breaker for the branched feeder line may trip. Finally, similar to the description above, if, a main feeder line detects a third number of arc faults over a third period of time, then the main feeder line circuit breaker may trip. Thus, there may be three or more levels of coordination according to an embodiment of the present invention.

Figure 5:
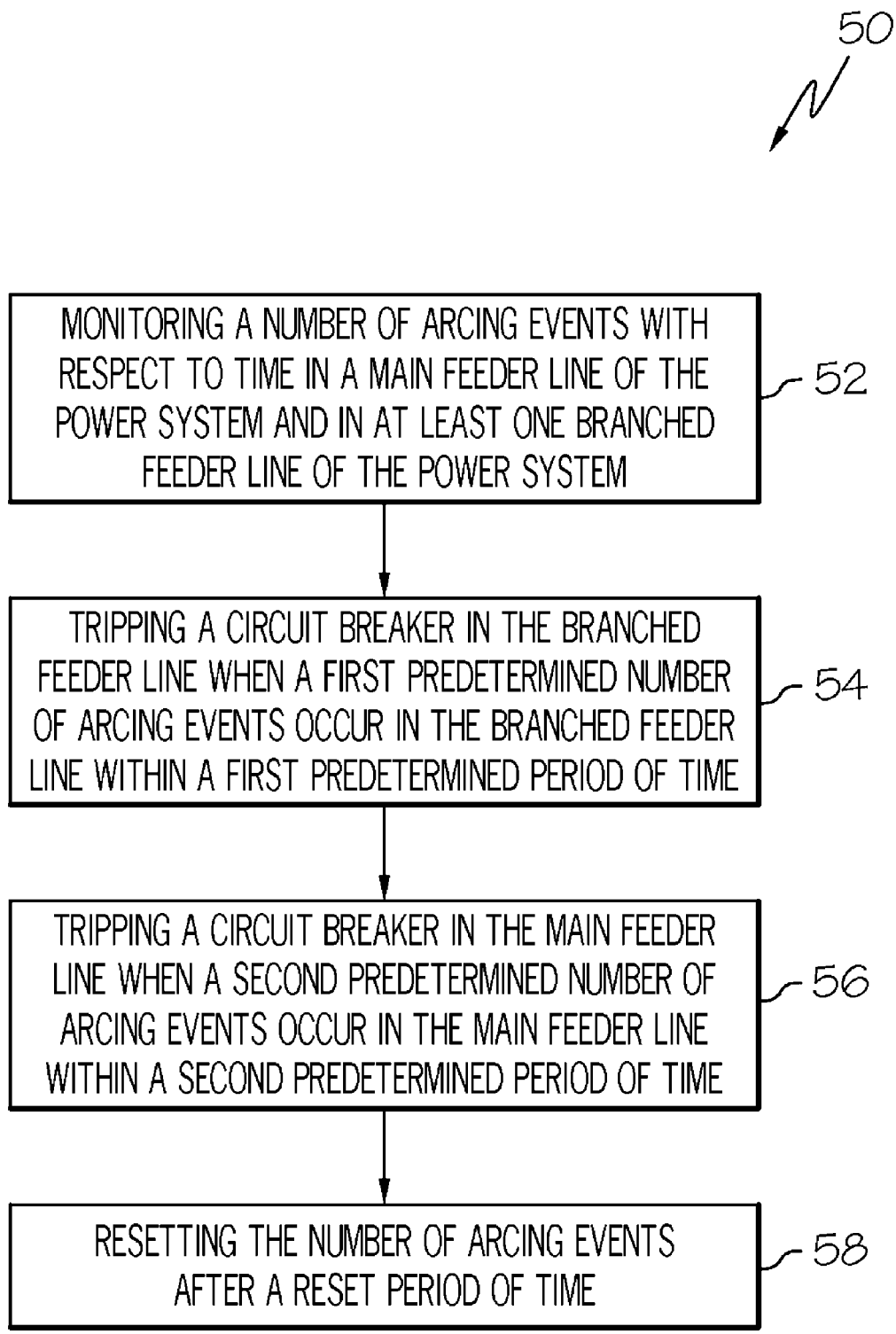
FIG. 5 is a flow chart describing a method according to the present invention.

Referring to FIG. 5, there is shown a flow chart describing a method 50 according to an embodiment of the present invention. The method 50 may include a first step 52 of monitoring a number of confirmed arc signature with respect to time in a main feeder line of the power system and in at least one branched feeder line of the power system. This monitoring step may be carried out, for example, by ELCU 12-1, 14a-1 and 14b-1. The method 50 may include a step 54 of tripping a circuit breaker in one of the at least one branched feeder lines when a first predetermined number of confirmed arc signature occur in the branched feeder line within a first predetermined period of time. The method 50 may include a further step 56 of tripping a circuit breaker in the main feeder line when a second predetermined number of confirmed arc signature occur in the main feeder line within a second predetermined period of time. Finally, the method 50 may include a step 58 of resetting the number of confirmed arc signature after a reset period of time.

It should be understood, of course, that the foregoing relates to exemplary embodiments of the invention and that modifications may be made without departing from the spirit and scope of the invention as set forth in the following claims.

We claim:

1. A method for coordinating arc fault protection in a power system, the method comprising:
   monitoring concurrently a number of confirmed arc signatures with respect to time in a main feeder line of the power system and in at least one branched feeder line of the power system;
   tripping a circuit breaker in the branched feeder line if a first predetermined number of confirmed arc signatures occur in the branched feeder line within a first predetermined period of time; and
   tripping a circuit breaker in the main feeder line if a second predetermined number of confirmed arc signatures greater than the first predetermined plurality of confirmed arc signatures occur in the main feeder line within a second predetermined period of time, wherein
   the second predetermined period of time is greater than the first predetermined period of time such that an arc in the branched feeder line trips only the circuit breaker in the branched feeder line without tripping the circuit breaker in the main feeder line.

2. The method of claim 1, further comprising resetting the number of confirmed arc signatures after a reset period of time.

3. The method of claim 1, wherein the first predetermined number of confirmed arc signatures is between two and four and the second predetermined number of confirmed arc signatures is between four and eight.

4. The method of claim 1, wherein the confirmed arc signatures are selected from the group consisting of a parallel arc, a series arc and a wet arc.

5. The method of claim 1, wherein the monitoring step is carried out by an electronic load control unit, and wherein no direct communication is required between an electronic load control unit at the main feeder line and an electronic load control unit at the branched feeder line.

6. The method of claim 1, further comprising detecting an arc signature as one of the number of confirmed arc signatures.

7. The method of claim 1, further comprising tripping a circuit breaker in a sub-branched feeder line, the sub-branched feeder line branching from the branched feeder line, when a third predetermined number of confirmed arc signatures occur in the branched feeder line within a third predetermined period of time, wherein the third predetermined number of confirmed arc signatures is less than the first predetermined number of confirmed arc signatures.

8. A method for coordinating arc fault protection in a power system, the method comprising:
   monitoring confirmed arc signatures with respect to time in a main feeder line of the power system with a main feeder line controller;
   monitoring confirmed arc signatures with respect to time in at least one branched feeder line of the power system with a controller in each of the at least one branched feeder lines;
   tripping a circuit breaker in the branched feeder line when a first predetermined number of confirmed arc signatures occur in the at least one branched feeder lines within a first predetermined period of time; and
   tripping a circuit breaker in the main feeder line when a second predetermined number of confirmed arc signatures occur in the main feeder line within a second predetermined period of time, wherein
   the second predetermined period of time is greater than the first predetermined period of time such that an arc in the at least one branched feeder lines trips only the circuit breaker in the at least one branched feeder lines without tripping the circuit breaker in the main feeder line; and
   there is an absence of any physical connection between the main feeder line controller and any of the branched feeder line controllers.

9. The method of claim 8, wherein the second predetermined number of confirmed arc signatures is greater than the first predetermined number of confirmed arc signatures.

10. The method of claim 8, further comprising resetting a number of confirmed arc signatures after a reset period of time.

11. The method of claim 8, wherein the confirmed arc signatures are not solely energy based.

12. The method of claim 8, wherein the power system is a hierarchical power distribution system.

13. An apparatus for coordinating arc fault protection in a power system comprising:
   a main feeder line supplying power to at least a first and a second branched feeder;
   a control unit in each of the main feeder line and the first and second branched feeder lines configured to detect an arcing event therein; and
   a circuit breaker in each of the main feeder line and the first and second branched feeder lines, wherein
   the control unit in each of the branched feeder lines counts a number of confirmed arc signatures and signals the corresponding circuit breaker to trip when a first predetermined number of confirmed arc signatures occur within a first predetermined period of time;
   the control unit in the main feeder line counts the number of confirmed arc signatures and signals the corresponding circuit breaker to trip when a second predetermined number of confirmed arc signatures greater than the first predetermined number of confirmed arc signatures occur in the main feeder line within a second predetermined period of time;
   the second predetermined period of time is greater than the first predetermined period of time such that an arc in the branched feeder line trips only the circuit breaker in the branched feeder line without tripping the circuit breaker in the main feeder line.

14. The apparatus of claim 13, wherein the control unit in each of the main feeder line and the first and second branched feeder lines is an electronic load control unit.

15. The apparatus of claim 13, wherein the power system is a hierarchical power distribution system of an aircraft.

16. The apparatus of claim 13, wherein no physical connection is required between the control unit of the main feeder line and the control units of the branched feeder lines.

17. The apparatus of claim 13, wherein the number of confirmed arc signatures associated with said first predetermined time and second predetermined time resets after a predetermined time from detection of a first arcing event.

* * * * *